UNITED STATES PATENT OFFICE.

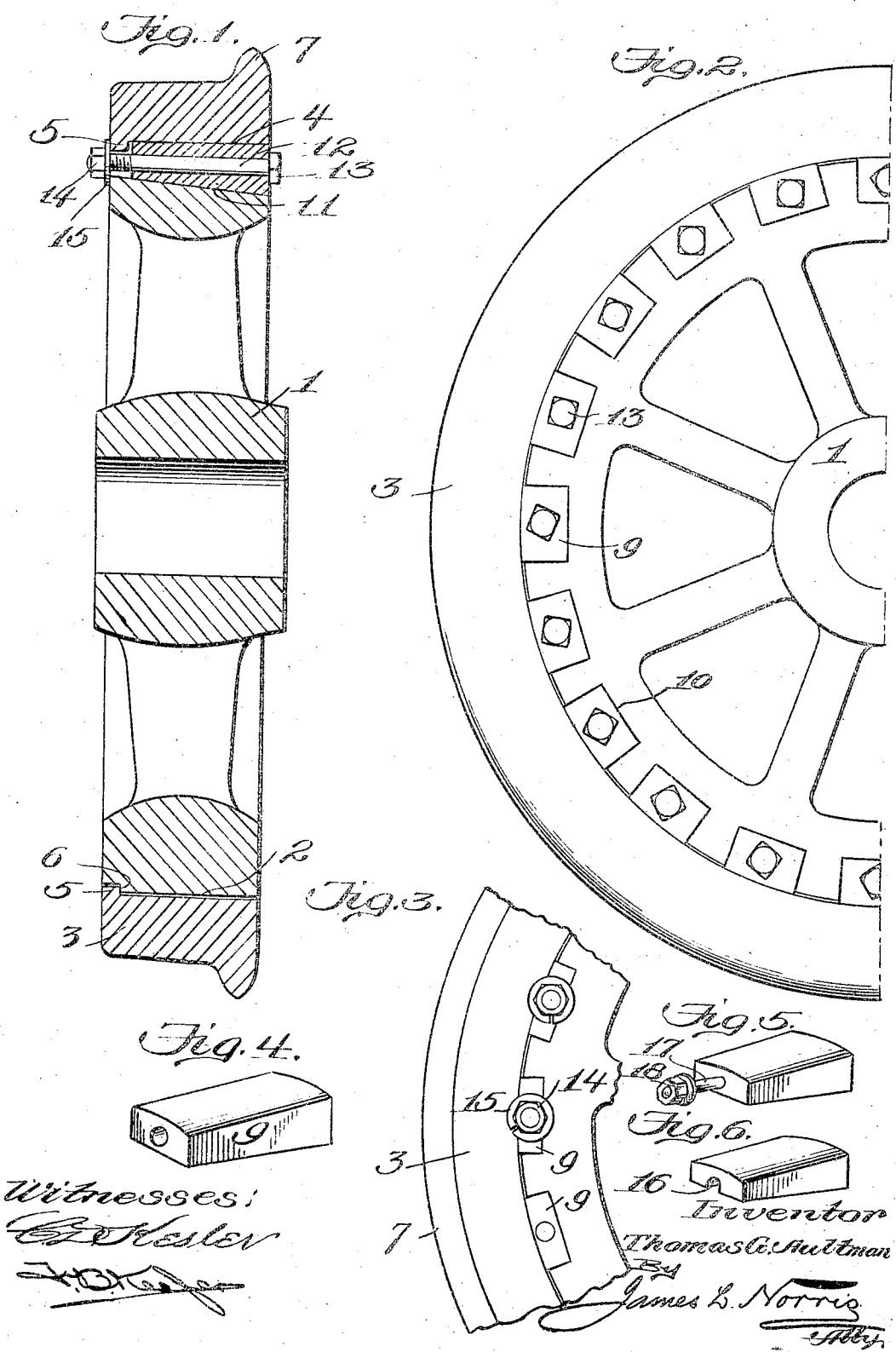

THOMAS G. AULTMAN, OF FAIRMONT, WEST VIRGINIA.

REMOVABLE TIRE FOR CAR-WHEELS.

No. 914,221.   Specification of Letters Patent.   Patented March 2, 1909.

Application filed April 3, 1908. Serial No. 425,026.

*To all whom it may concern:*

Be it known that I, THOMAS G. AULTMAN, a citizen of the United States, residing at Fairmont, in the county of Marion and State of West Virginia, have invented new and useful Improvements in Removable Tires for Car-Wheels, of which the following is a specification.

My present invention relates to improvements in flanged wheels of the character used on railways, and it has for its object to provide an improved wheel of this character wherein the tire is removably or detachably mounted on the central section or core, the construction of the wheel being such that it may be made cheaply, and in use, the tire is properly positioned and effectually secured upon the central wheel section, the periphery of the central section of the wheel and the internal bore of the tire having surfaces preferably parallel to the axis of the wheel, and a series of wedges being interposed between the tire and central section and provided with bolts for expanding them between the parts to secure the necessary locking action, a flange or shoulder on one part fitting into a recess on the other part in order to position the tire properly in the plane of the central wheel section.

To these and other ends, the invention consists in certain improvements, and combinations and arrangements of parts, all as will be hereinafter more fully described, the novel features being pointed out particularly in the claims at the end of the specification.

In the accompanying drawing: Figure 1 represents a sectional view of a car wheel constructed in accordance with my present invention; Fig. 2 represents a side elevation of a portion of the wheel shown in Fig. 1, viewing the latter from the right; Fig. 3 is an elevation of a portion of the wheel as viewed from the left in Fig. 1; Fig. 4 is a perspective view of one of the locking wedges; and Figs. 5 and 6 are detail views of different kinds of locking wedges which may be used.

Similar parts are designated by the same reference characters in the several views.

Wheels constructed in accordance with my present invention may be adapted for use on railway cars of various kinds, or they may be used on locomotives, and it is to be understood, of course, that in adapting the wheel to these different uses, certain changes or modifications may be made in the proportions of the parts and in the detail construction thereof.

I have shown in the accompanying drawing one embodiment of the invention wherein the wheel comprises a core or central section 1 adapted to fit the axle and having a peripheral surface 2 which is cylindrical so as to lie in a plane parallel to the axis of the wheel. This core may be made of cast metal, and it is provided with a tire 3 which is formed separately therefrom and may be made of steel or other metal having the desired wearing qualities. This tire is provided with an internal bore or surface 4 which is also cylindrical so as to lie in a plane parallel to the axis of the wheel and it is of the same diameter as the central section so as to fit thereon. One edge of the tire, the outer edge in the present instance, is provided with an internal flange or shoulder 5 which enters a recess formed in the corresponding edge of the core and it abuts against a circumferential shoulder 6 of the core so that when the tire is completely applied to the core, the tire will be properly positioned in the plane of rotation of the core section, the position of the wheel flange will be determined and fixed to correspond with the gage at all times, so that the rims and central sections constitute an interchangeable system, and the axial thrust of the tire received from the rail flange 7 will be sustained. These coöperating shoulders of the tire and core section may, however, be arranged at the inner edges of these parts as will be obvious, although it is generally preferable to arrange them in the relation shown.

The tire is locked upon the core or central section by devices which exert an expansive action between them, a set of wedges 9 being employed in the present instance which are spaced at suitable distances around the periphery of the core section and fit in recesses 10 formed therein. The outer sides of these wedges are parallel to the axis of the wheel and bear against the internal bore of the tire, and the inner edges of the wedges are tapered relatively to the axis of the wheel and are slidable on correspondingly tapered bottom surfaces 11 formed in the respective recesses. In the present instance, the wedges are reduced toward the internal flange or shoulder of the tire, and when the wedges are in fully locked position, they preferably do not quite reach this flange or shoulder. Any suitable means may be employed for drawing the wedges into locking position so as to expand the tire and thus center and lock it on the central section of the wheel. In the present instance, a bolt 12 is extended through each wedge, the bolt being anchored to the wedge in a suitable manner such as by means of the head 13 arranged at one side of the wheel, and the opposite end of the bolt is threaded to receive a tightening nut 14, the latter acting on the adjacent sides of the tire and central section respectively to draw the wedge into locked position. The inner and outer faces of the tire and core section preferably lie in parallel planes perpendicular to the axis of the wheel, and may be flush, as shown. These wedges support the weight imposed upon the tire by the central wheel section, and they may be supplied of such width and number as may be desired. In the present instance, a spring washer 15 is provided which overlaps the tire and central wheel section, and the expansive properties of this washer serve to prevent loosening of the nut and wedge by reason of vibration or because of the unequal expansion between the tire and core due to the heat generated upon the tire, the elastic washer serving to draw the wedges tight should the tire expand more rapidly than the core section.

By making the peripheral surface of the central or core section and the internal bore of the tire of cylindrical form, so as to lie in planes parallel to the axis of the wheel, the turning or boring operations on these parts are materially simplified and cheapened, the necessity of turning these parts on tapers wherein accuracy of fit and angle is required, being thereby avoided, and by interposing the locking wedges between the tire and central section and providing bolts for shifting the wedges in directions parallel to the axis of the wheel, an accurate centering and locking of the tire with respect to the central section are insured. Moreover, by providing one of the parts, preferably the tire, with a flange or shoulder which enters a recess and engages a corresponding shoulder on the other part, the tire is firmly and accurately positioned so as to rotate in a plane precisely perpendicular to the axis of the wheel, the position of the wheel flange is accurately positioned so as to correspond with the track gage, and the axial thrust in one direction is sustained thereby, the wedges and their coöperating bolts serving to sustain the axial thrust in the opposite direction.

In Figs. 5 and 6, I have illustrated wedges somewhat different from that shown in Fig. 4 and which may be used in place thereof, the wedge shown in Fig. 6 having a groove or channel 16 at one side to receive the fastening bolt, while in the wedge shown in Fig. 5, a tang or bolt 17 is formed integrally at one end of the wedge, a nut 18 coöperating with said tang or bolt to draw the wedge tight and lock it.

I claim as my invention:—

1. A wheel comprising a core section, a tire section removably fitted thereon, the coöperating inner and outer surfaces of said parts being parallel to the axis of the wheel, and a series of locking wedges interposed between the tire and core section and arranged within the said inner surface of the tire section, the wedges being operable to lock the tire thereon.

2. A wheel comprising a core section having circumferentially spaced recesses in its periphery, a tire having a continuous internal surface parallel to the axis of the wheel, and a series of wedges inserted in said recesses between the core section and tire and operable to lock the tire in position.

3. A wheel comprising a core section and a tire removably fitted thereon, the coöperating inner and outer surfaces of the tire and core sections respectively being parallel to the axis of the wheel, one of said parts having at one side an annular shoulder adapted to enter a corresponding recess in the other part to position said tire with respect to the plane of rotation of the wheel, and a series of wedges inserted from the opposite side of the wheel relatively to said shoulder and between the tire and core section for locking the tire thereon.

4. A wheel comprising a core section having a periphery parallel to the axis of the wheel, a tire removably fitted on the core section and also having an internal surface parallel to the axis of the wheel, said parts having coöperating shoulders at one side of the wheel to position the tire with respect to the plane of rotation, and a series of circumferentially spaced wedges interposed between the core section and tire and movable toward said shoulders in tightening for locking the tire in position.

5. A wheel comprising a core section, a tire removably fitted thereon, a series of wedges interposed between the core section and tire for locking the latter in position, and means coöperating with said wedges for automatically tightening the same upon the expansion or loosening of the tire.

6. A wheel comprising a core section provided with a series of circumferentially spaced tapering recesses, a tire detachably fitting said core section, coöperating circumferentially extending shoulders on the core section and tire for preventing relative axial movement in one direction, a series of wedges inserted in said recesses and coöperating with the inner circumference of the tire, and bolts coöperating with said wedges and provided with spring washers for automatically tightening the wedges upon the expansion or loosening of the tire.

In testimony whereof I have hereunto set my hand in presence of two subscribing witnesses.

THOMAS G. AULTMAN.

Witnesses:
　C. C. BROWN,
　FRED. HEHNICK.